United States Patent [19]

Meurer

[11] Patent Number: 4,986,915
[45] Date of Patent: Jan. 22, 1991

[54] TAPE DRIVE WITH SELF-EXPANDING COILS FOR SLUDGE COLLECTOR

[75] Inventor: Charles L. Meurer, Golden, Colo.

[73] Assignee: Baker Hughes Incorporated, Houston, Tex.

[21] Appl. No.: 491,566

[22] Filed: Mar. 9, 1990

Related U.S. Application Data

[62] Division of Ser. No. 321,440, Mar. 9, 1989, Pat. No. 4,927,537.

[51] Int. Cl.[5] .................. B01D 21/20; B01D 21/04
[52] U.S. Cl. .................................. 210/527; 74/89.22; 185/39; 254/278
[58] Field of Search ............... 210/527, 803; 74/89.22; 185/37, 39, 40 R, 45; 254/278

[56] References Cited

U.S. PATENT DOCUMENTS

| Re. 24,112 | 1/1956 | Addicho | 254/370 |
|---|---|---|---|
| 400,503 | 4/1889 | Stanley | 254/294 |
| 630,962 | 8/1899 | Wood | 33/719 |
| 747,113 | 12/1903 | Allen | 212/76 |
| 903,032 | 11/1908 | Violuti-Tercari | 172/215 |
| 1,918,742 | 7/1933 | Elrod | 210/527 |
| 2,101,079 | 12/1937 | Lund | 210/527 |
| 2,101,080 | 12/1937 | Lund | 210/527 |
| 2,646,889 | 7/1953 | Dulak | 210/207 |
| 2,768,749 | 10/1956 | Easterday | 210/527 |
| 3,416,176 | 12/1968 | Ravitts | 15/1.7 |
| 3,500,692 | 3/1970 | Sangster et al. | 74/89.22 |
| 3,559,954 | 2/1971 | Chambers et al. | 254/106 |
| 3,676,885 | 7/1972 | Wulk | 15/1.7 |
| 3,732,701 | 5/1973 | Lynch | 254/105 |
| 3,872,960 | 3/1975 | Gabor | 197/53 |
| 3,954,619 | 5/1976 | Fry | 210/525 |
| 4,054,520 | 10/1977 | McGivern | 210/122 |
| 4,193,871 | 3/1980 | White et al. | 210/142 |
| 4,198,871 | 4/1980 | Dunn et al. | 74/37 |
| 4,401,576 | 8/1983 | Meurer | 210/803 |
| 4,440,354 | 4/1984 | Kobayashi et al. | 74/89.22 |
| 4,477,939 | 10/1984 | White et al. | 15/246.5 |
| 4,660,325 | 4/1987 | Bauer et al. | 49/352 |
| 4,724,088 | 2/1988 | Zetterlund | 210/525 |

FOREIGN PATENT DOCUMENTS

29203 of 1904 United Kingdom .

Primary Examiner—Richard V. Fisher
Assistant Examiner—Christopher Upton
Attorney, Agent, or Firm—Steve Rosenblatt

[57] ABSTRACT

Apparatus for taking up and paying out first and second ends of an endless loop of tape that has an intermediate section. A first reel connected to the first end carries a first coil of the tape. The fist coil extends from the first reel and is normally self-expanding and unwinding so as to unwind itself from the first reel. A second reel is connected to the second end for carrying a second coil of the tape. The second coil extends from the second reel and is normally self-expanding so as to unwind itself from the second reel. A drum supports both of the first and second reels for rotation in the same direction. Pulleys guide the intermediate section of the tape from the first reel to the second reel for moving a sludge collector. When the drum is rotated in a first rotary direction, the first coil tends to self-unwind from the first reel and the second coil is wound up on the second reel to move the intermediate section of the tape and the sludge collector. Upon rotation of the drum in a second rotary direction, the second coil tends to self-unwind from the second reel to apply tension to the tape and the first coil is wound up on the first reel to move the intermediate section of the tape and the sludge collector.

7 Claims, 10 Drawing Sheets

TAPE DRIVE WITH SELF-EXPANDING COILS FOR SLUDGE COLLECTOR

This is a divisional of co-pending application Ser. No. 321,440, filed on Mar. 9, 1989, now U.S. Pat. No. 4,927,537.

BACKGROUND OF THE INVENTION

1. Field of the Invention

This application relates to drives for reciprocating equipment along a work path and more particularly to a reel system for winding up and paying out two self-expanding coiled tapes to reciprocate equipment along a track for use in clarifier basins.

2. Discussion of Prior Art

In the past, clarifier basins have been provided with sediment collecting devices that move on a track fixed to the floor of the basin. In one such device, patented by applicant in U.S. Pat. No. 4,401,576, a carriage is provided for movement along the track. The carriage is moved by a stepping mechanism that grips the track and moves the carriage relative to the track. Although such stepping mechanism has been commercially successful, mechanisms that are located under water are inherently difficult to maintain because the track is located under water where the sediment or sludge collects on the floor of the clarifier basin.

In other devices for removing sludge from the floor of clarifier basins, floats are pulled alternately in opposite directions across the surface of the clarifier basin. Pipes extend from the float to the floor for sludge collection. The floats are pulled by a cable that has first and second ends. The first end is wound in one direction on a winch and the second end of the cable is wound in the opposite direction on the winch, such that rotation of the winch in one direction unwinds the first end of the cable and winds up the second end of the cable to pull the float in one direction across the basin. Reversing the direction of rotation of the winch reverses the direction in which the float is pulled across the basin. In the device of this type disclosed in U.S. Pat. No. 3,416,176 issued in 1968, the winch has a fixed diameter drum. Both the first and second ends of the cable are tightly wound on the drum of the winch. In this device, if the travel of the float is long enough to require the cables to wind on themselves and form more than one layer on the drum, the length of cable unwound from the now larger diameter on the drum will exceed that wound on the drum, which requires use of spring-biased pulleys, for example, to compensate for the unequal lengths.

In other clarifier basins that are provided with apparatus for removing sludge, the direction of movement of a bridge across the clarifier basin is reversed by reversing the direction of a drive motor. This occurs by tripping switches when the bridge reaches the end of its motion in a particular direction. In other devices for removing sludge from clarifier basins, an elongated power screw is mounted across the top of the clarifier basin. This screw is rotated by a motor. A ball nut actuator is threaded onto the power screw and is mounted on a carriage against rotation. When the motor rotates the power screw, the carriage is reciprocated over the top of the clarifier basin.

In other drives for reciprocating devices along a path, one end of a cable is wound in one direction on a drum and the other end of the cable is wound in the other direction on the drum. In one such unit disclosed in U.S. Pat. No. 630,962 issued in 1899, the drum is provided with three surfaces, the outer two of which surfaces are conical in shape for receiving a pair of cables that are wound in a first direction. The other surface, a central cylindrical drum, receives a sounding line that is wound in a direction opposite to that of the cables. This unit requires the use of cable guides that are provided on a lead screw for guiding the cables onto selected and controlled portions of the conical surfaces.

In the art of moving or lifting objects, the single drum of an ordinary hoist has been provided with a ring that divides the single drum into two sections. In one such apparatus disclosed in U.S. Pat. No. 747,113 issued in 1903, a button has been provided on such ring and is used for engaging a rope so that as both sections of the drum are rotated in the same direction, one section of the drum winds up one length of rope while the other section of the drum unwinds another length of rope.

In other drives for positioning transducers along a longitudinal path, such as disclosed in U.S. Pat. No. 4,198,871 issued in 1980, a capstan is provided with a cylindrical surface to which opposite ends of a flexible, steel belt are secured. Those ends of the belt are wrapped in opposite directions on the capstan so that rotation of the capstan in a given direction unwinds one end and winds up the other end. In this device, those end are wound tightly on the capstan such that the belt does not become uncoiled when the direction of rotation of the capstan is changed.

In a swimming pool cleaning device disclosed in U.S. Pat. No. 2,646,889 issued in 1953, a vertically extending guide rod is used to support a cleaning head that is moved up and down within the swimming pool under the action of a manually operated winch. Cables are wound in the same direction on the winch such that rotation of the winch in a given direction winds in both of the cables to lift the cleaning head.

In a high speed printer disclosed in U.S. Pat. No. 3,872,960 issued in 1975, a motor drives a helically grooved pulley which has attached to it left and right cable segments of equal length. The other ends of the cable segments are attached to a movable carriage. One pulley of this system is spring biased to remove any slack from either of the cables which might occur due to long term temperature drift. Thus, both cable segments are held tight against the grooved pulley.

SUMMARY OF THE PRESENT INVENTION

In applicant's experience with devices for collecting sludge from clarifier basins, driving devices located under water are difficult to perform maintenance on because they are under water. Thus, maintenance must be performed when the basin is empty (and thus shut down) or a diver must go under water to make the repair. Attempts to mount such driving devices above the water level often result in using heavy power screws that interfere with operations conducted above the water level. When reels have been used for winding up cables that move such devices, complex drum shapes have been required to equalize the diameter of the cable on a full reel relative to that of an empty reel.

When a cable of such devices is being unwound from a reel and a cable is being wound onto another or the same reel, other spring biasing techniques have been required to apply tension to both cables. Accordingly, there is still a need in the art of equipment, such as sludge collectors, and moving in clarifier basins, for a simple, reliable drive located out of the liquid in the basin and operated by one motor, wherein no extra cable tensioning techniques and no complex drum shapes are required.

An object of the present invention is to provide a new and improved drive unit for reciprocating a carriage on a track, where the drive unit is remote from the carriage.

Another object of the present invention is to move a unit in liquid contained in a clarifier basin using a single motor that is located out of the basin.

A further object of the present invention relates to a single motor driving separate reels on which steel tape is wound in opposite directions, wherein the rotation of the reels in one direction permits the steel tape on one reel to self-expand into a loose coil that is restricted in diameter.

An additional object of the present invention is to provide a pair of first and second reels that are selectively connected to a common drum that is rotated in either of two opposite directions by a common motor, wherein a first metal tape is wound on the first reel in a direction opposite to that in which a second metal tape is wound on the second reel so that as the first metal tape is tightly wound on the first reel the second metal tape self-expands into a loose coil to resist the unwinding of the second tape from the second reel.

A still further object of the present invention is to provide a wiper for cleaning and drying a metal tape as it is wound onto a reel on which the metal tape self-uncoils after being wound into coil form.

Yet another object of the present invention is to stop a drive when a carriage reaches the end of a clarifier basin and, after pausing to allow the drive to stop, reversing the drive to move the carriage to the other end of the basin.

With these and other objects in mind, the present invention relates in general to an apparatus for taking up and paying out first and second ends of an endless loop of tape that has an intermediate section. A first reel connected to the first end carries a first coil of the tape. The first coil extends from the first reel and is normally self-expanding and unwinding so as to unwind itself from the first reel. A second reel is connected to the second end for carrying a second coil of the tape. The second coil extends from the second reel and is normally self-expanding so as to unwind itself from the second reel.

A drum supports both of the first and second reels for rotation in the same direction. A series of pulleys guides the intermediate section of the tape from the first reel to the second reel. A motor rotates the drum in a first rotary direction so that the first coil tends to self-unwind from the first reel and the second coil is wound up on the second reel, which at that time functions as a take-up reel, to move the intermediate section of the tape toward the second reel and to draw the tape from the first coil that is self-expanding. The motor is effective to rotate the drum in a second rotary direction so that the second coil tends to self-unwind from the second reel to apply tension to the tape and the first coil is wound up on the first reel, which at that time functions as a take-up reel, to move the intermediate section of the tape toward the first reel and to draw the tape from the second coil against the tension of the self-unwinding second coil.

When the ends of the tape are connected to a carriage of a sludge collector that rides on a track in a clarifier basin, the tension from the self-unwinding coil opposes, but is less than, the tension caused by the take up reel so that the loop of tape is held against the pulleys without using spring biasing techniques that may interfere with other operations in the clarifier basin.

BRIEF DESCRIPTION OF THE DRAWINGS

Other objects, features and advantages of the present invention will be apparent from an examination of the following detailed descriptions which include the attached drawings in which:

FIG. 7B is on the right, together form an elevational view of a second embodiment of the tape drive of the present invention including spaced reels, each having a connecting ring for selective connection to a drum driven by a pulley, where the left reel is shown in cross section;

DETAILED DESCRIPTION

Figure 1:
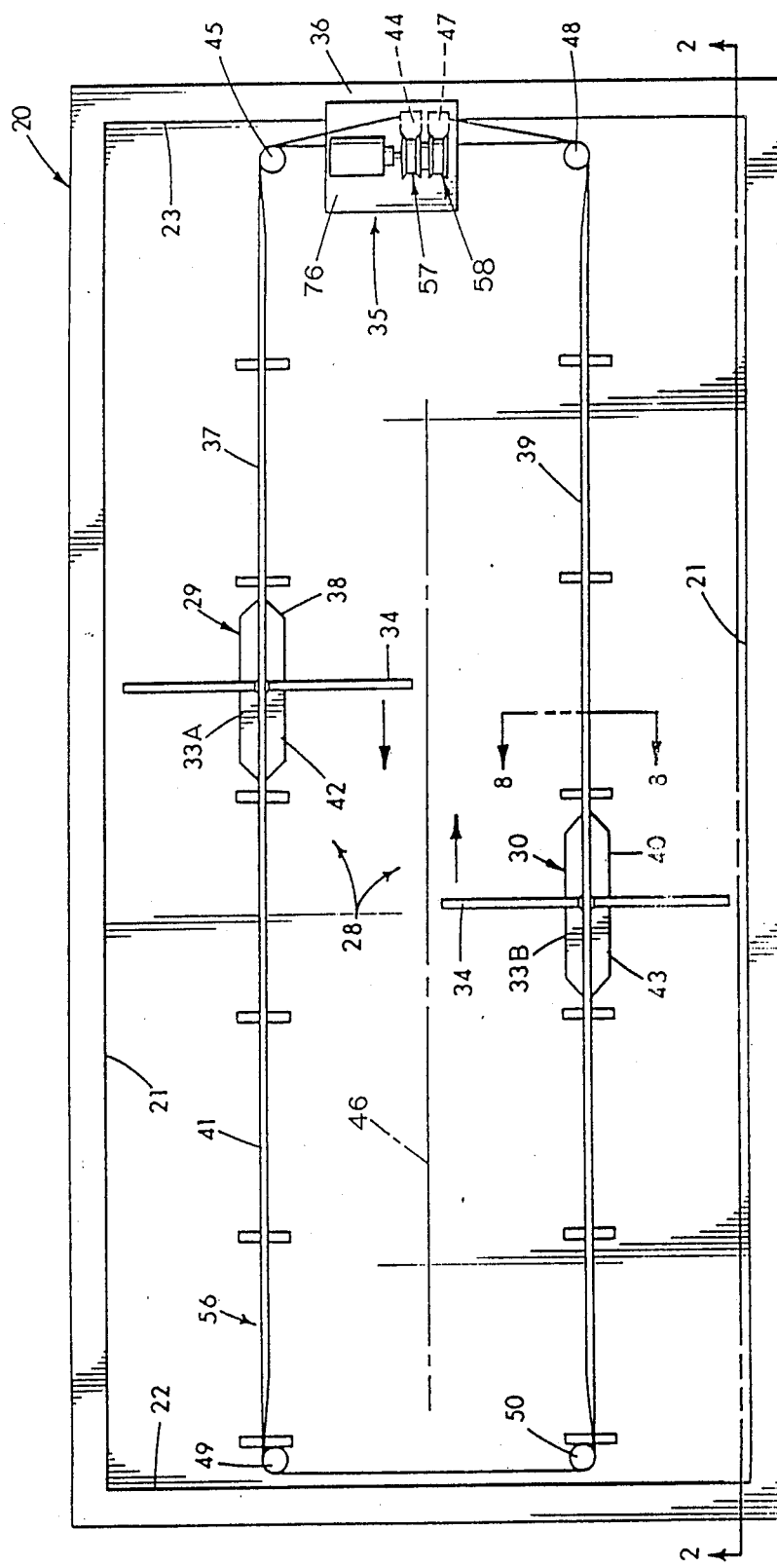
FIG. 1 is a plan view of a rectangular clarifier basin provided with a pair of sludge collectors driven by a tape drive of the present invention.
Figure 2:
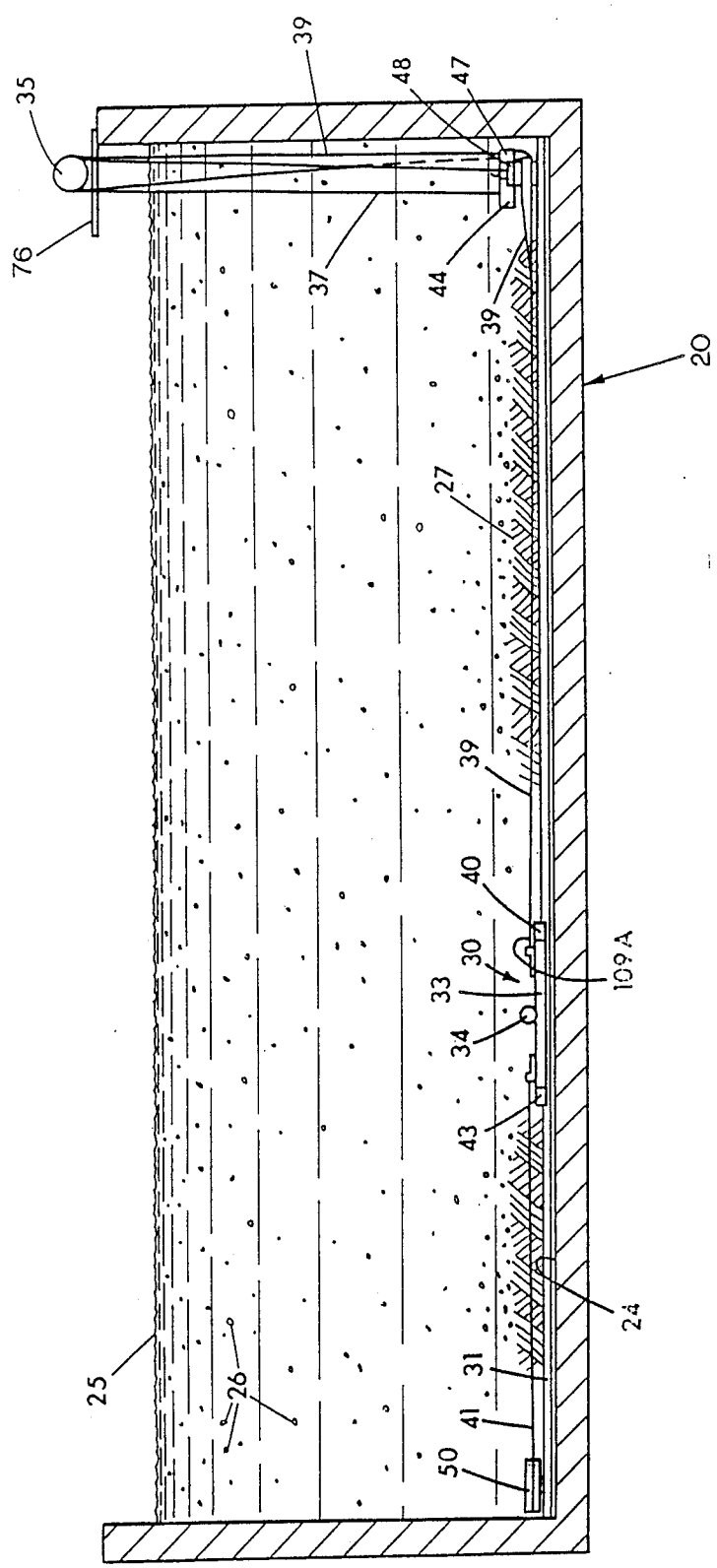
FIG. 2 is a vertical cross section taken along line 2—2 in FIG. 1 illustrating the sludge collectors shown in FIG. 1 mounted for reciprocating movement on a floor of the clarifier basin.

Referring now to FIGS. 1 and 2, a clarifier basin 20 is shown having lateral walls 21 and left and right end walls 22 and 23. In FIG. 2, a bottom or floor 24 of the basin 20 is shown. The basin 20 contains liquid 25 and particles 26 suspended in the liquid 25. The particles 26 tend to settle to the floor 24 and form a layer of sludge 27. In FIG. 1 a pair 28 of sludge collectors is shown, including a first sludge collector 29 at the top of FIG. 1 and a second sludge collector 30 at the bottom in FIG. 1. Each sludge collector 29 includes a track 31 (FIGS.

2 and 8) mounted on a bracket 32 secured to the floor 24 of the clarifier basin 20. Carriages 33A and 33B ride along the track 31 and carry a header pipe 34 connected to a suction hose (not shown). The sludge collectors 29 and 30 may, for example, be constructed in the manner disclosed in applicant's U.S. Pat. No. 4,401,576 except for the stepping mechanism that is replaced by a tape drive 35 of the present invention.

Figure 8:
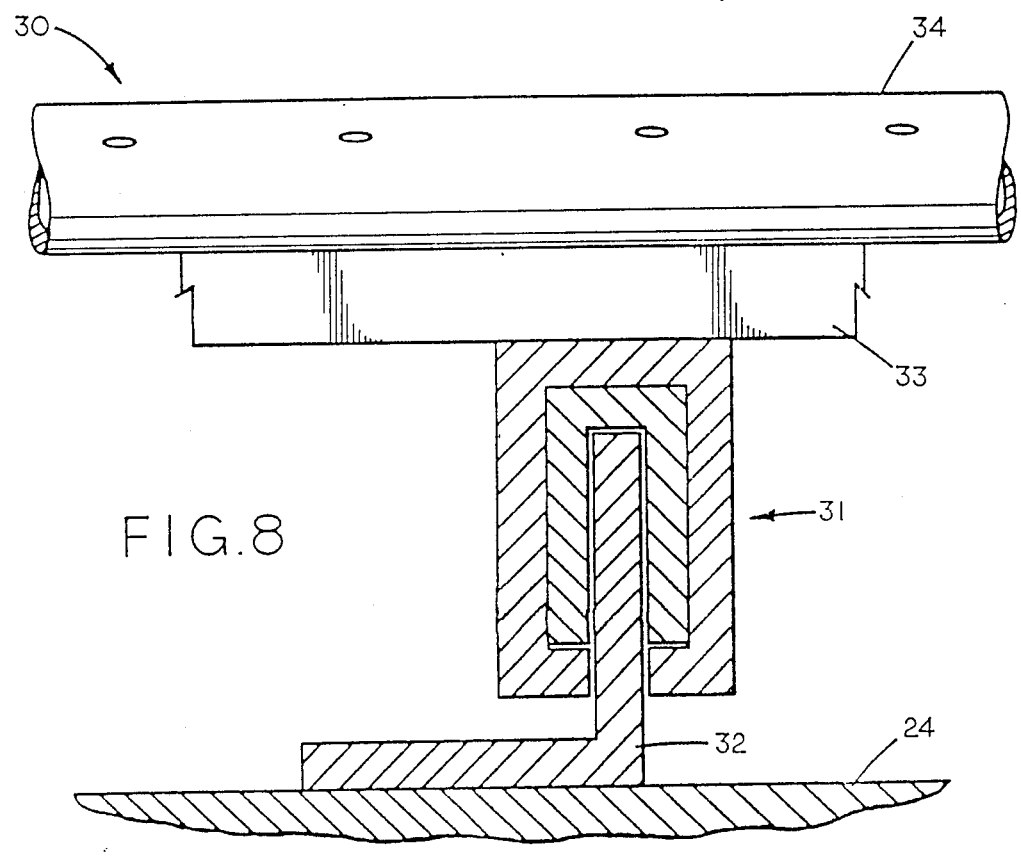
FIG. 8 is a cross sectional view taken along line 8—8 in FIG. 1 showing a carriage of the sludge collector riding on a track supported on the floor of the clarifier basin.

The tape drive 35 is mounted at a common support location 36 and includes a first tape 37 shown in FIG. 1 extending between the tape drive 35 and a first end 38 of the first sludge collector 29. A second tape 39 is shown connected between the tape drive 35 and a first end 40 of the second sludge collector 30. A third tape 41 is connected to second ends 42 and 43 respectively of the sludge collectors 29 and 30. A set of pulleys is provided for guiding the tapes 37, 39 and 41. The first tape 37 extends downwardly from the tape drive 35, around respective first and second pulleys 44 and 45 (FIG. 1), along a path parallel to a longitudinal axis 46 (FIG. 1) of the clarifier basin 20 and extends along a first of the tracks 31 (FIGS. 2 and 8) for connection to the first end 38 of the first sludge collector 29. Similarly, the second tape 39 extends downwardly into the clarifier basin 20, around third and fourth pulleys 47 and 48, respectively, and extends along a second of the tracks 31 (FIGS. 2 and 8) for connection to the first end 40 of the second sludge collector 30. The third tape 41 extends around fifth and sixth pulleys 49 and 50 from the second end 42 of the first sludge collector 29 to the second end 43 of the second sludge collector 30.

Figure 3:
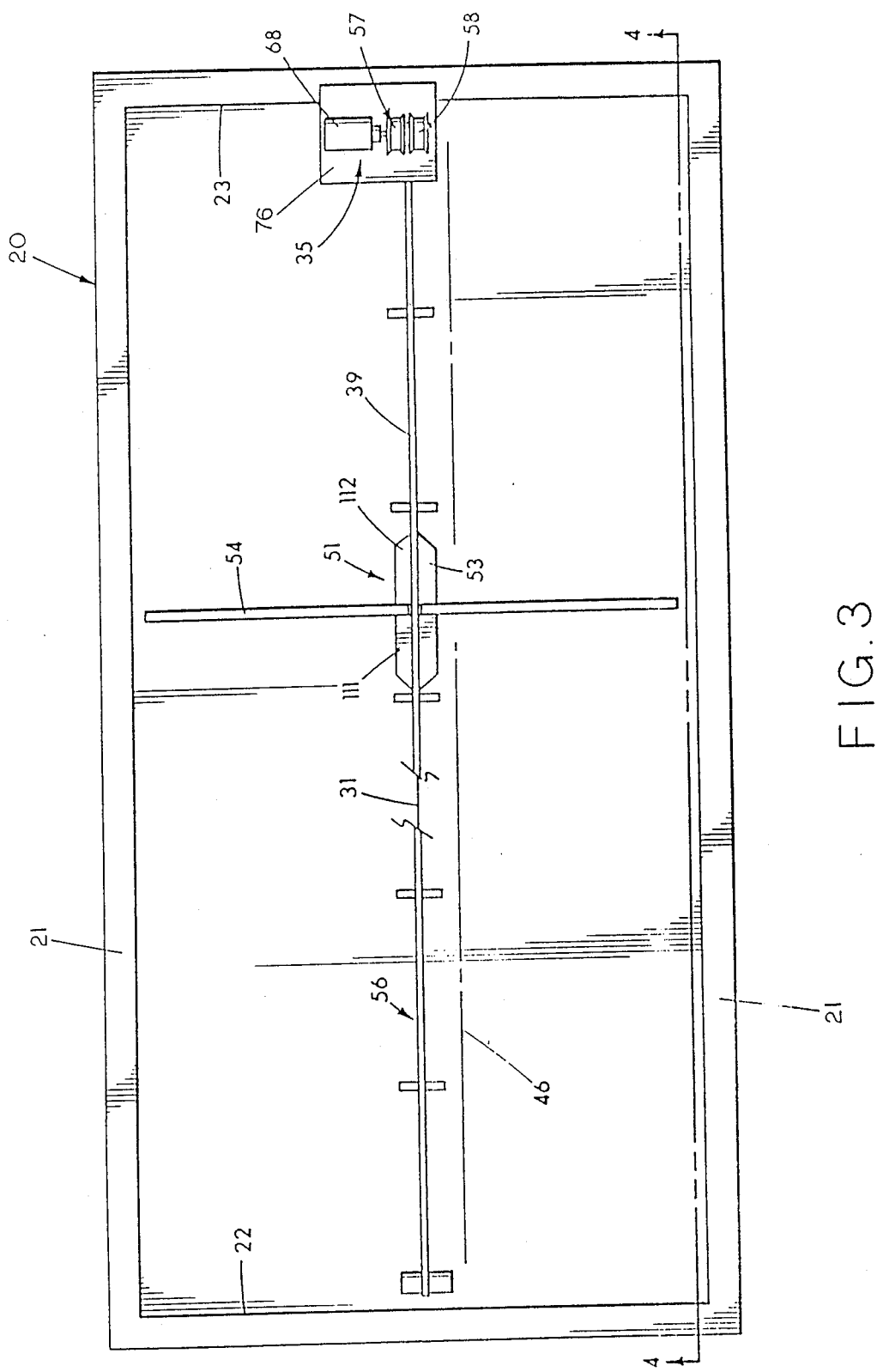
FIG. 3 is a plan view of a second clarifier basin wherein a single sludge collector is mounted for reciprocating motion along the bottom of the clarifier basin, showing a tape drive of the present invention for moving the single sludge collector.
Figure 4:
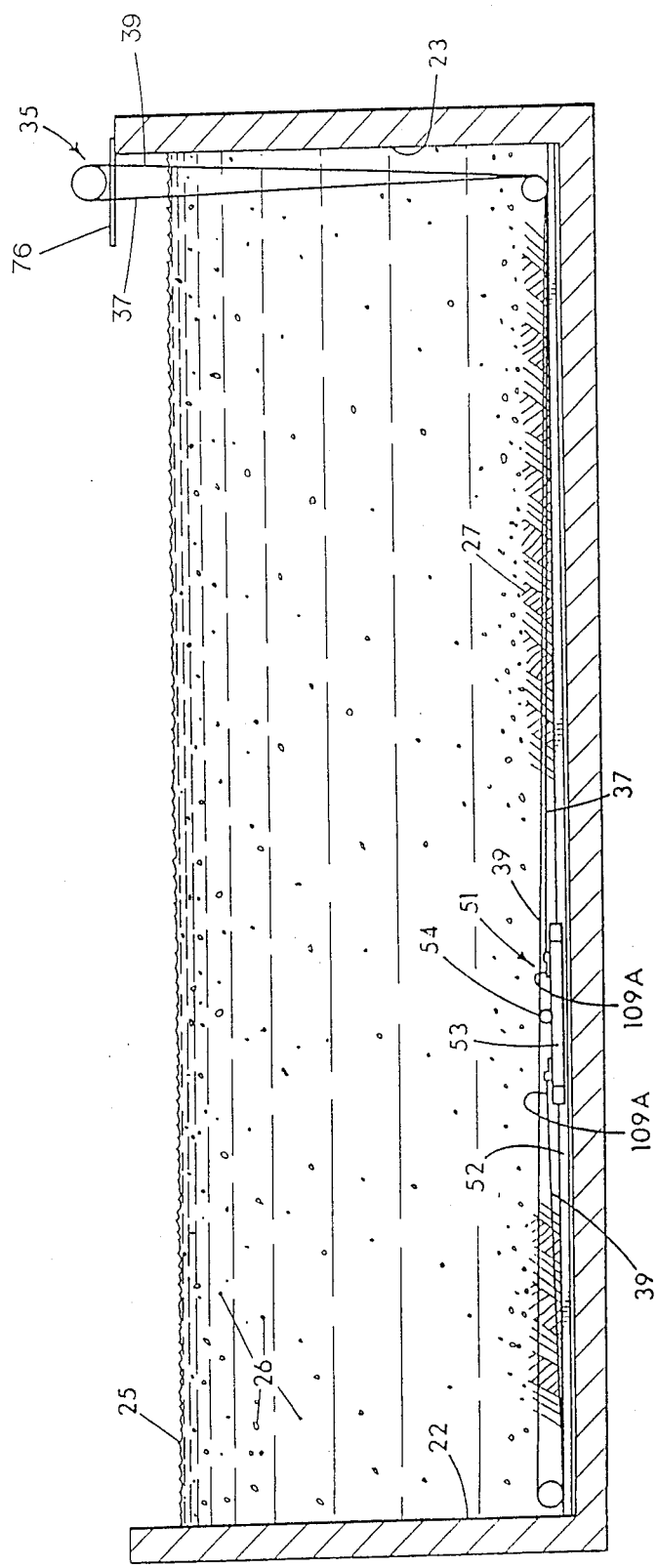
FIG. 4 is a vertical cross-sectional view taken along line 4—4 in FIG. 3 illustrating the clarifier basin shown in FIG. 3 with the tape drive according to the present invention.

Referring to FIGS. 3 and 4, it may be understood that a third, single sludge collector 51 is shown mounted along a central track 52 and riding on a single carriage 53. A sludge collecting header pipe 54 of the third sludge collector 51 extends across the full width of the clarifier basin 20 thus allowing use of only the one carriage 53. Also, only two tapes, in the form of the first tape 37 and the second tape 39, are required to move the third sludge collector 51 on the track 52.

Although the first, second and third tapes 37, 39 and 41 respectively in FIGS. 1 and 2, and the respective first and second tapes 37 and 39 in FIGS. 3 and 4, are separately identified, they in effect form an endless loop 56 that extends from the tape drive 35, around the various pulleys 44, 45, 49, 50, 48 and 47 as shown in FIGS. 1 through 4, to the respective sludge collectors 29 and 30, or 51, and back to the tape drive 35.

According to the principles of the present invention, the tape drive 35 shown in FIGS. 1 and 2, and the same tape drive 35 shown in FIGS. 3 and 4, is effective to pull in or wind up the first tape 37 onto a first reel 57 (FIG. 3) and at the same time permit the second tape 39 to be payed out or unwound from a second reel 58 (FIG. 3). In FIGS. 1 and 2, this operation advances a first carriage 33 of the first sludge collector 29 toward the right end wall 23 nearest the tape drive 35 at the location 36. Such movement of the first sludge collector 29 pulls the third tape 41 around the respective fifth and sixth pulleys 49 and 50 to pull the second sludge collector 30 away from the right end wall 23 toward the left end wall 22 of the clarifier basin 20. In FIGS. 3 and 4, the reeling in of the first tape 37 causes the third carriage 53 to move toward the right end wall 23 of the clarifier basin 20 and the paying out of the second tape 39 permits such movement of the third carriage 53.

GENERAL DESCRIPTION: TAPE DRIVE 35 AND TAPES 37, 39 AND 41

Figure 5:
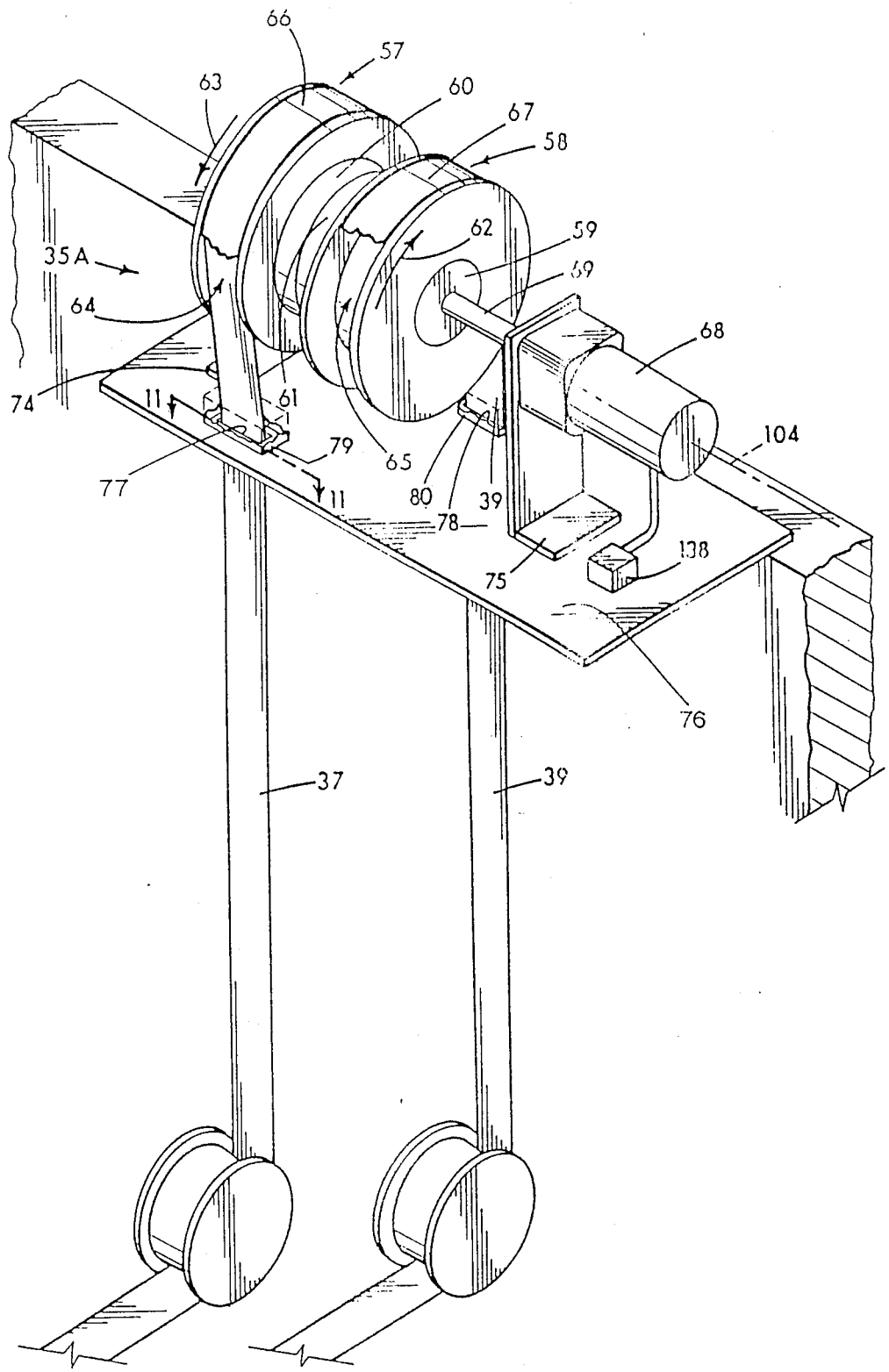
FIG. 5 is a perspective view of one embodiment of the tape drive of the present invention, showing a pair of spaced reels mounted on a common shaft, wherein resilient metal tape is shown self-expanded into coils on the reels, where each coil is retained by a strap.

Referring now to FIG. 5, a first embodiment of the tape drive 35 of the present invention is shown, and is referred to using the reference number 35A, whereas in FIGS. 6 through 10 a second embodiment of the tape drive 35 is shown and is referred to using the reference number 35B. The tape drives 35A and 35B are the same except for the manner in which a drum 59 is driven. Accordingly, for purposes of description, when the tape drive 35 is referred to, the structure of the tape drives 35A and 35B is the same.

Figure 6:
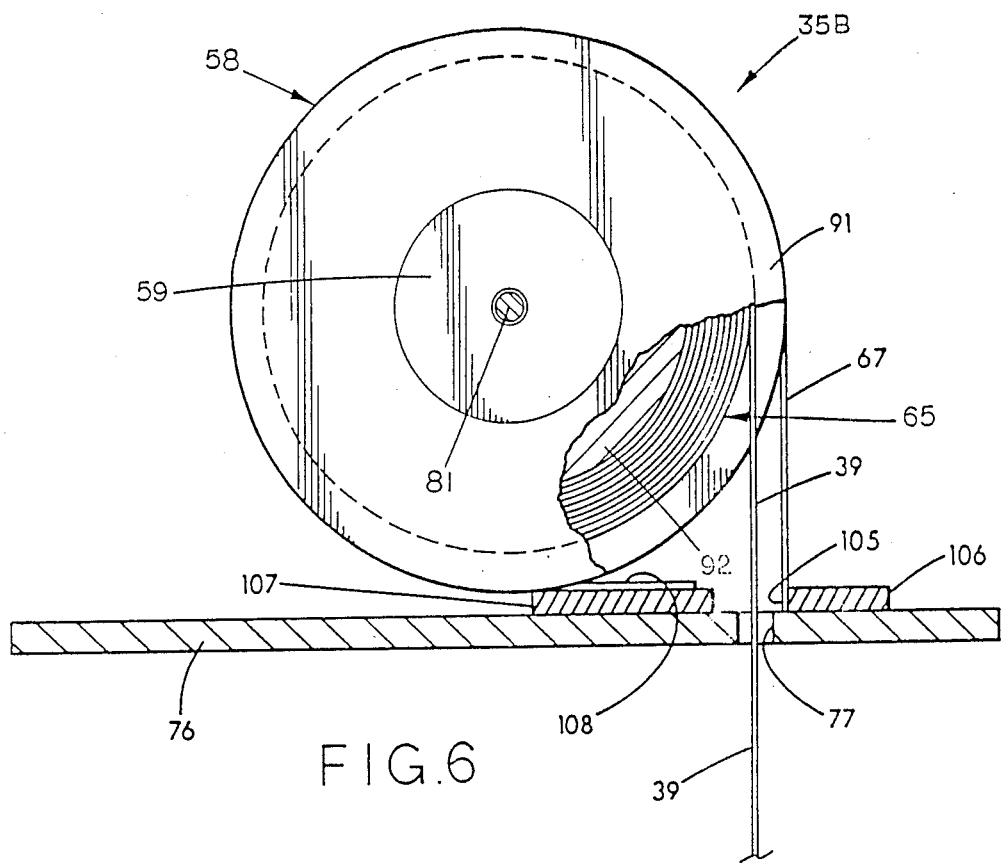
FIG. 6 is an end view of the tape drive of the present invention showing the retainer strap extending around the expanded coil shown in FIG. 5 for retaining the coil on one of the reels.

The tape drive 35 includes the drum 59 and the respective first and second reels 57 and 58 that are mounted on the drum 59 for free rotation thereon. A first connecting ring 60 is attached to the first reel 57 and a second connecting ring 61 is attached to the second reel 58. The connecting ring 60 or 61 of a particular reel 57 or 58 selectively couples the reel to the drum 59 such that when that coupling ring, e.g., the second coupling ring 61, is disconnected from the drum 59 the second reel 58 can be rotated independently of the first reel 57 to index the second tape 39 to either tighten or loosen the second tape 39 on the second reel 58. As shown in FIG. 5, the first tape 37 is wound in a first or clockwise direction (see arrow 62) around the first reel 57 such that when the first reel 57 rotates clockwise (see arrow 62) the first tape 37 is wound onto or is taken up on the first reel 57. The second tape 39 is shown wound in a second or counterclockwise direction (see arrow 63) around the second reel 58. As described in detail below, the first and second tapes 37 and 39 are formed from thin steel webs. Such tapes 37 and 39 have a characteristic of self-uncoiling from the coiled configurations shown in FIG. 5, where the first tape 37 is shown formed into a first coil 64 on the first reel 37 and the second tape 39 is shown formed into a second coil 65 on the second reel 58. In other words, this characteristic of the tapes 37 and 39 causes the coils 64 and 65 to self-expand in diameter. When the drum 59 is not being rotated, this self-uncoiling or expanding characteristic causes the expanding coil 64 or 65 to apply tension on the respective tape 37 or 39 which pulls on the end 38, 40, 42, or 43 of the carriage 33 to which it is connected. When the drum 59 is rotated in the counterclockwise direction (see arrow 63) the first coil 64 of the first tape 37 becomes loose and the self-expanding characteristic causes the diameter of the first coil 64 to increase. To prevent the first coil 64 from expanding and becoming uncoiled from the first reel 57, a first retainer strap 66, shown in greater detail in FIG. 6, extends around 270° of the first reel 57 and prevents the first coil 64 from becoming uncoiled and disengaged from the first reel 57. A similar second retainer strap 67 extends around the second reel 58 as shown in FIG. 6 for retaining the second coil 65 on the second reel 58 as the second coil 65 self-expands or self-uncoils upon rotation of the drum 59 in the clockwise direction (see arrow 62).

TAPE DRIVE 35-DETAILED DESCRIPTION

Referring to FIG. 5, the tape drive 35A is shown driven by a motor 68 that drives a shaft 69. The shaft 69 is connected directly to the drum 59.

Figure 7A:
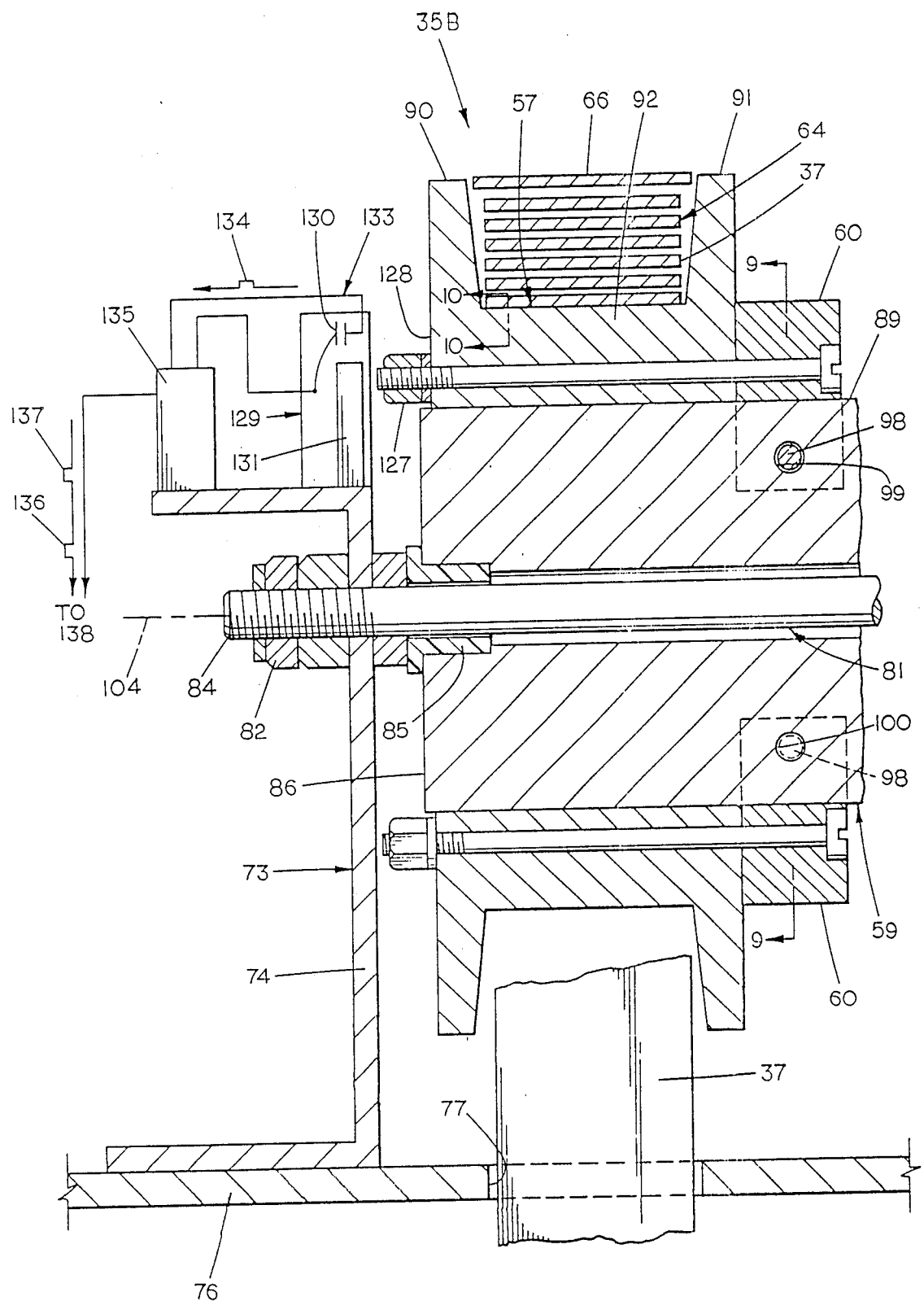
FIGS. 7A and 7B, when placed so that FIG. 7A is on the left
Figure 7B:
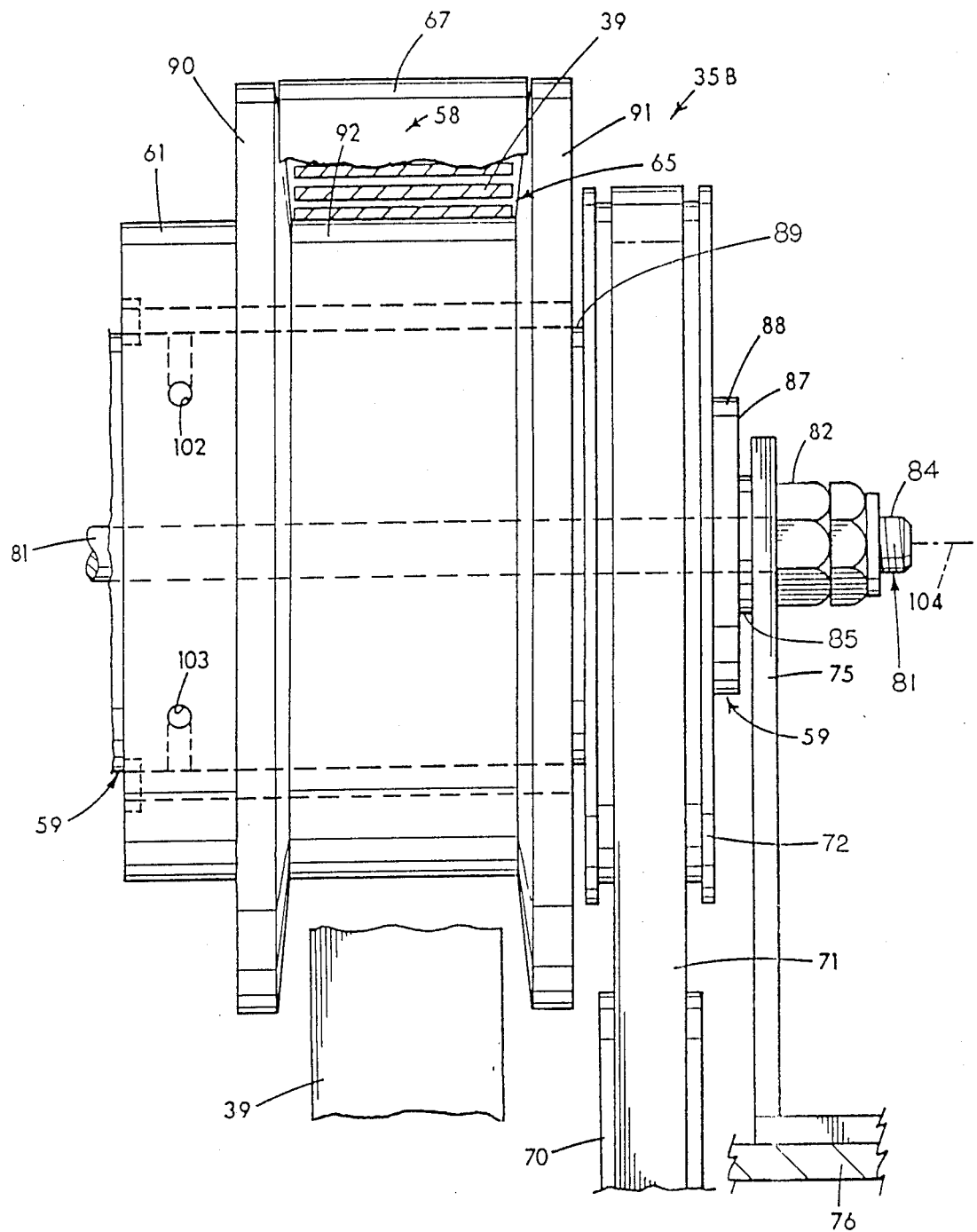

In FIGS. 7A and 7B, the second embodiment of the tape drive 35B is shown including a first pulley 70 driven by a motor such as the motor 68 shown in FIG. 5. The first pulley 70 drives a standard belt 71 that extends around a second pulley 72 connected to the drum 59.

Referring in detail to FIG. 7, each tape drive 35 includes a pair 73 (FIG. 7A) of respective left and right end brackets 74 (FIG. 7A) and 75 (FIG. 7B) fixed to a metal plate 76 that serves as the base of the tape drive 35. The metal base plate 76 is mounted (as shown in FIGS. 1 through 4) on the right end wall 23 of the clarifier basin 20. As shown in FIG. 5, the base plate 76 is provided with a first slot 77 vertically aligned with the first tape 37 as it extends downwardly from the first reel 57, and a second slot 78 is vertically aligned with the second tape 39 as it extends downwardly from the second reel 58. First and second wiper assemblies 79 and 80 respectively are mounted on the base plate 76 above each of the respective first and second slots 77 and 78 for cleaning the respective first and second tapes 37 and 39. A shaft 81 extends through the end brackets 74 and 75 and is held to the end brackets 74 and 75 by nuts 82 on opposite threaded ends 83 and 84 of the shaft 81. A bushing 85 is placed over each end of the shaft 81 to reduce friction between respective left and right ends 86 and 87 of the drum 59 and the brackets 74 and 75, and between the shaft 81 and the drum 59. The bushing 85 may be made from acetal material sold by the duPont Company under the trademark "Delrin."

The right end 87 of the drum 59 has a reduced outer diameter section 88 that is slightly tapered to receive the second pulley 72. The second pulley 72 is force fit over the reduced diameter section 88 of the drum 59. The second pulley 72 is bolted to a larger outer diameter section 89 of the drum 59 to secure it in driving engagement with the drum 59. It may be understood then, that the second pulley 72 rotates the drum 59 on the shaft 81.

Figure 9:
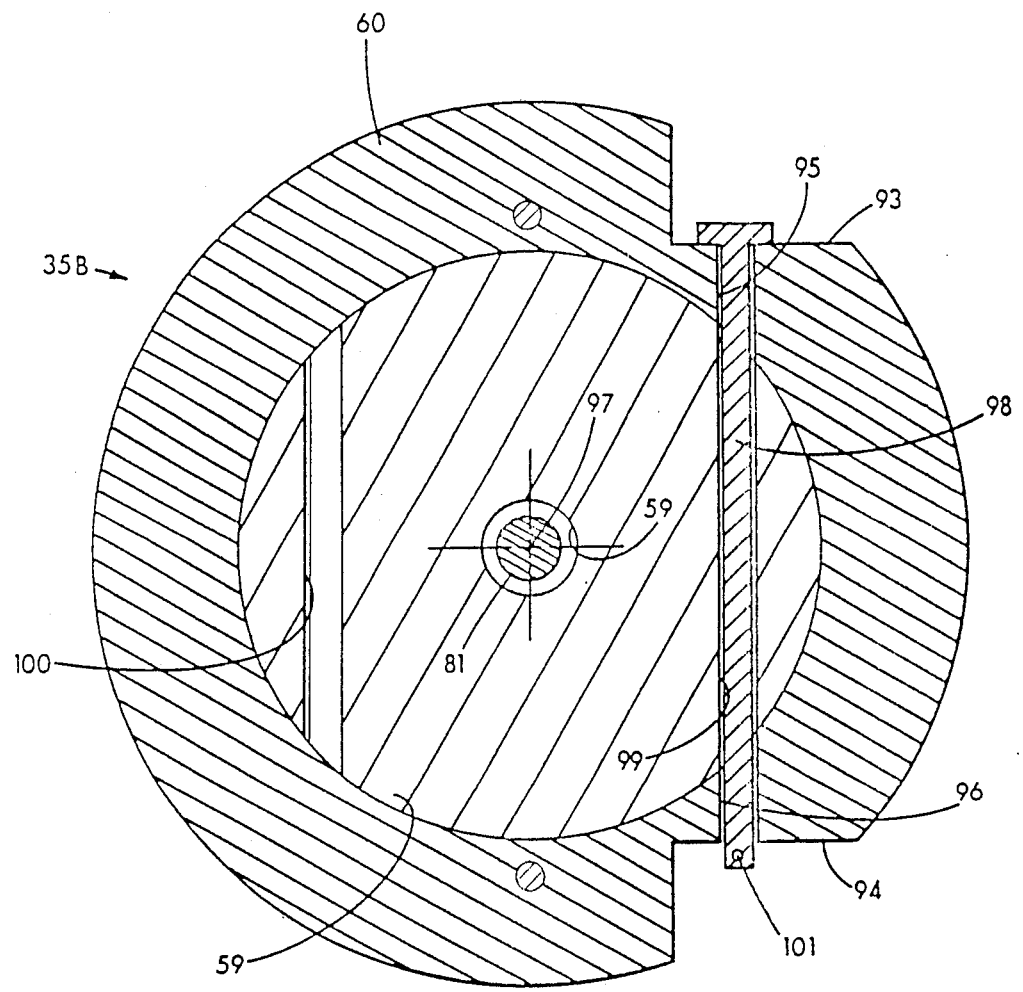
FIG. 9 is a cross-sectional view taken along the line 9—9 in FIG. 7A showing a connecting ring that is coupled to one of the reels for selective connection to the drum by a drive pin.

Each of the respective first and second reels 57 and 58 includes two flanges, a left flange 90 and a right flange 91, that are mounted on opposite sides of a reel hub 92. The left or first reel 57 in FIG. 7A is attached to the first or left connecting ring 60. The left connecting ring 60 is bolted to the right flange 91 of the first reel 57 to form an integral unit comprising the two flanges 90 and 91, the hub 92, and the first connecting ring 60. The right or second connecting ring 61 of the second reel 58 (shown on the left in FIG. 7B) is bolted to the left flange 90 of the second reel 58. As shown in FIG. 9 for the connecting ring 60, and as is also applicable to the connecting ring 61, the ring 60 has upper and lower cut-outs 93 and 94 and first and second vertically extending bores 95 and 96 that are offset from a center 97 of the ring 60 or 61 to receive one of two index pins 98. The index pin 98 extends through the bores 95 and 96 in the first connecting ring 60 into one of two bores 99 (FIG. 9) and 100 (FIG. 7A) that extend through the drum 59 in longitudinal alignment with the bores 95 and 96 in the first ring 60. The index pin 98 thus connects the first connecting ring 60 to the drum 59 for rotating the first reel 57. Upon removal of a cotter pin 101 (FIG. 9) from the index pin 98 and removal of the index pin 98 from both the drum 59 and the first connecting ring 60, the first reel 57 can be rotated independently of the drum 59 to wind the first tape 37 onto the first reel 57 or unwind the first tape 37 from the first reel 57 to adjust the position of the first sludge collector 29 along the track 31. To reconnect the drum 59 to the first connecting ring 60, the first reel 57 is rotated to align the bores 95 and 96 of the first ring 60 with one of the bores 99 or 100 of the drum 59, the index pin 98 is inserted into those bores 95, 96 and 99 or 100 and the cotter pin 101 is inserted.

It is to be understood that the drum 59 and the shaft 81 extend axially across FIGS. 7A and 7B, such that the drum 59 drives both of the connecting rings 60 and 61 when the index pins 98 are inserted as described above.

In addition to the bores 99 and 100 provided in the drum 59 for use with the left or first index pin 98 and the first ring 60, third and fourth bores 102 and 103 (FIG. 7B) are provided in the drum 59 axially spaced from the bores 99 and 100. The second connecting ring 61 need only be rotated one-half turn between aligning the bores 95 and 96 with one of the two bores 102 or 103 in the drum 59 and the second index pin 98 is inserted into the bores 95, 102 or 103, and 96 to connect the second reel 58 to the drum 59.

RETAINER STRAPS 66 AND 67

Referring again to FIGS. 7A and 7B, the respective first and second reels 57 and 58 and are shown in side-by-side relationship and having the index pins 98 placed in the bores 95, 96 and 99, and the bores 95, 96 and 102, to connect each reel 57 and 58 to the drum 59 for rotation in unison around an axis 104. Referring also to FIG. 5, the second coil 65 that is wound on the second reel 58 is shown having fewer turns and for purposes of description the second reel 58 in FIG. 5 will be described as being rotated counterclockwise (arrow 63) to wind the second tape 39 onto the second reel 58. Because the first reel 57 rotates with and in the same direction as the second reel 58, and because there are many more turns of the first tape 37 on the first reel 57 (as shown in FIGS. 5 and 7A), as the first reel 57 rotates counterclockwise (arrow 63) the first tape 37 will quickly loosen and self-expand in diameter as shown in FIGS. 5, 7A and 7B to that of the outer diameter of the flanges 90 and 91.

The retainer straps 66 and 67 are the same. As shown in FIGS. 5, 6, 7A and 7B, the retainer strap 66 is provided with a first end 105 (FIG. 6) that is secured by a bracket 106 to the base plate 76. The retainer strap 66 extends from the base plate 76 vertically and at an angle of 90° on the drum 59 engages and extends between the flanges 90 and 91 and around the first reel 57 between those flanges 90 and 91 to approximately a 360° angle on the drum 59. A bracket 107 secures a second end 108 to the base plate 76. In a similar manner, the second retainer strap 67 extends around the second reel 58 for retaining the second coil 65 when it assumes the expanded position described below. The retainer straps 66 and 67 are fabricated from the same material from which the first and second tapes 37 and 39 are fabricated as described below and are thus of sufficient tensile strength to withstand the force of the coils 64 and 65 in their expanded configurations (e.g., the first coil 64 on the left in FIG. 7A).

TAPES 37 AND 39

The respective first and second tapes 37 and 39 are fabricated from steel having a thickness of from five to twenty thousandths of an inch and a width of from one to two and one-half inches. The length of the respective first, second and third tapes 37, 39 and 41 of course varies according to the particular distance between the location 36 at which the tape drive 35 is mounted on the wall 23 of the clarifier basin 20 and the location of the particular sludge collector 29, 30 or 51 to be advanced along the track 31. These tapes 37, 39 and 41 are fabricated from rolled sheet steel stock having a normal rolled width of about forty-eight inches and are slit in a normal manner into the tapes 37, 39 and 41 having the width of from one to two and one-half inches. The steel material is standard grade, stainless steel tape, providing corrosion and abrasion resistance for use in the clarifier basin 20.

Figure 10:
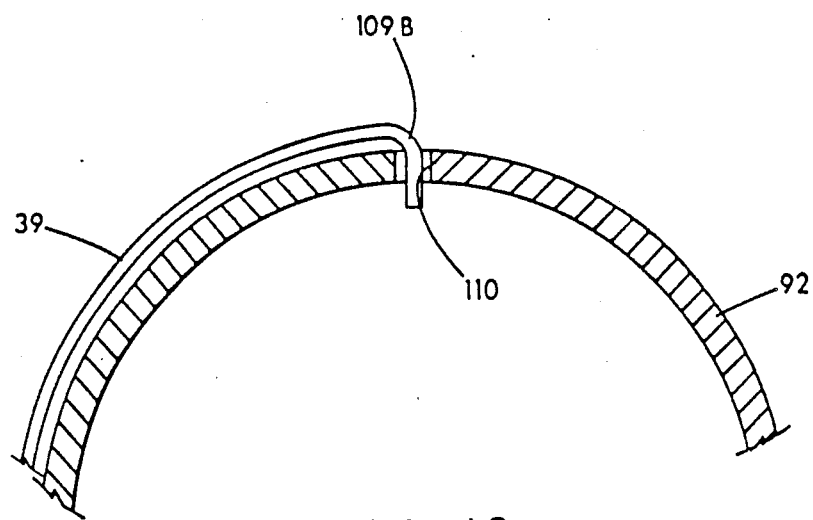
FIG. 10 is a partial cross-sectional view taken along line 10—10 in FIG. 7A showing a slot in the second hub for securing the second tape to the second reel.

Using steel material having such specifications, FIG. 10 shows a first end 109B of the second tape 39 placed in a slot 110 of the hub 92 and bent. The tape 37 is secured to the hub in the same way. With the index pins 98 removed from the bores 95, 96 and 99 or 102, for example, the reels 57 and 58 are then rotated while tension is placed on the tapes 37 and 39 so that the tapes 37 and 39 become coiled tightly on the respective reel 57 and 58. The outer diameters of the coils 64 and 65 are selected according to which coil 64 or 65 is to initially have the larger diameter (see FIGS. 5, 7A and 7B where the first coil 64 has the larger diameter). The self-expanding or self-unwinding characteristic of the steel tapes 37 and 39 causes the coils 64 and 65 of such tapes 37 and 39 to tend to unwind into a flat, straight position as soon as tension is relieved. For example, if the first tape 37 is wound around the first hub 92 into the first coil 64, relieving the tension that holds the first tape 37 in the shape of the tightly wound first coil 64 allows the first coil 64 to self-expand or unwind by itself. The force of the self-unwinding of the first tape 37 is such that the first tape 37 will tend to be pulled upwardly through the first slot 77 in the base plate 76 and thus apply tension on the first tape 37 as it extends around the pulleys 44 and 45. In the example shown in FIG. 3, with the first tape 37 connected to a right end 112 of the carriage 53 and the second tape 39 connected to a left end 111 of the carriage 53, such uncoiling force of the first tape 37 is overcome by the force of the second tape 39 as it is wound onto the second reel 58. It may be understood then, that as the second tape 39 is wound onto the second reel 58, the self-uncoiling force of the first coil 64 is effective to have the first tape 37 resist the force of the second tape 39 that moves the carriage 53 along the track 31, such that both the respective first and second tapes 37 and 39 are in tension without the use of any other springs or tensioning devices.

TAPE WIPERS 79 AND 80

Figure 11:
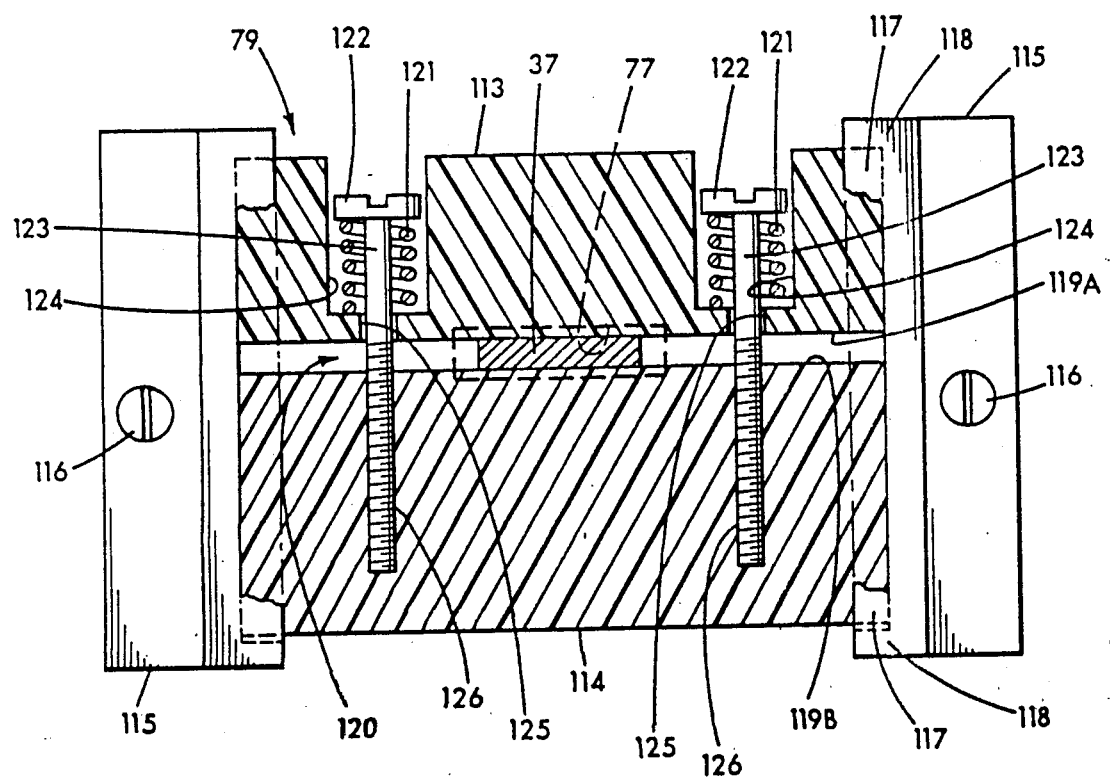
FIG. 11 is a cross-sectional view taken along line 11—11 in FIG. 5 showing a tape wiper for cleaning and drying one of the tapes as they approach the reels.

Referring now to FIGS. 5 and 11, the tape wipers 79 and 80 are shown mounted on the base plate 76 over each of the respective slots 77 and 78, the slot 77 being shown in FIG. 10. The tape wipers 79 and 80 include a first wiper block 113 and a second wiper block 114 that are slidable on the base plate 76 toward and away from each other. Z-shaped brackets 115 are secured, as by a screw 116, to the base plate 76 and have an upper lip 117 that extends over each of the first and second wiper blocks 113 and 114 to hold them on the base plate 76, yet allow them to slide thereon. Ends 118 of the brackets 115 extend around the first and second wiper blocks 113 and 114 to limit the extent of the horizontal travel of the first and second wiper blocks 113 and 114. In FIG. 11, the first and second wiper blocks 113 and 114 are shown having opposed wiper edges 119A and 119B that form a tape receiving slot 120 that is vertically aligned with the slot 77. The tape wiper 80 for the slot 78 is similarly positioned relative to the slot 78. The tape receiving slot 120 has a variable width to permit initial feeding of the respective first or second tape 37 or 39 into the tape receiving slot 120 and then into the respective slot 77 or 78 from the respective first reel 57 or second reel 58. The first and second wiper blocks 113 and 114 are urged toward each other by springs 121 that urge heads 122 of bolts 123 out of large diameter bores 124 formed in the first wiper block 113. Smaller diameter bores 125 are aligned with the large diameter bores 124 and receive the bolts 123, which extend into tapped holes 126 in the second wiper block 114. By rotating the bolts 123 and threading them further into or out of the tapped holes 126, there is either more or less force applied by the springs 121 urging the first and second wiper blocks 113 and 114 toward each other. This force may be adjusted in the range of five to twenty pounds. The tapes 37 or 39 are thus squeezed between the wiper edges 119A and 119B, which scrape the liquid 25, the particles 26 and the sludge 27 from the tapes 37 and 39 so that the tapes 37 and 39 are clean and relatively dry as they travel to the respective reels 57 and 58. The wiper blocks 113 and 114 are fabricated from hard plastic, such as PVC or acetal (sold by the duPont Company under the trademark "Delrin"), which has the required abrasion resistance and hardness to effectively wipe the tapes 37 and 39 clean and relatively dry.

With the respective first and second tapes 37 and 39 clean and relatively dry as they advance onto the respective reels 57 and 58, the self-uncoiling or expanding action of the tapes 37 and 39 is not interfered with by the liquids 25, the particles 26 or the sludge 27.

SLUDGE COLLECTORS 29, 30 AND 51

Each sludge collector is a standard unit such as that disclosed in applicant's U.S. Pat. No. 4,401,576, except that the stepping mechanism shown in that patent is not used. Instead, second ends 109A (FIG. 4) of the respective first and second tapes 37 and 39 are connected to the respective carriages 33A, 33B and 53. The carriages 33A, 33B and 53 carry a vacuum hose (not shown) that is connected to header pipes 34 that draw the sludge 27 and the liquid 26 from the floor 24 of the clarifier basin 20.

REVERSING CONTROL FOR MOTOR 68

Referring to FIGS. 3 and 4, when the sludge collector 51 has moved to the right wall 23, the motor 68 changes rotational direction. During that change in direction, the second tape 39 that was previously in tension because of the counterclockwise rotation of the motor 68, now loosens as the motor 68 starts to turn clockwise (arrow 63). With such loosening of tension on the second tape 39, the second tape 39 self-uncoils and assumes a diameter equal to about that of the diameter of the flanges 90 and 91 such that the second coil 39 engages the second retainer strap 67. Also, as the motor 68 started to rotate clockwise the first coil 64 was initially at the expanded diameter equal to that of the diameter of the flanges 90 and 91. Continued clockwise rotation of the motor 68 rotates the first reel 57 and causes the first hub 92 to tighten the turns of the first coil 64 so that the diameter of the first coil 64 becomes smaller until it becomes tightly wound. The third sludge collector 51 then starts to move to the right in FIG. 3 as the tension on the first tape 37 overcomes the opposite tension of the self-uncoiled second tape 39. When the sludge collector 51 has moved to the left wall 22, the motor 68 again changes direction. The same directional change cycling applies with respect to the sludge collectors 29 and 30 shown in FIGS. 1 and 2, with those collectors 29 and 30 moving in opposite directions at each reversal of the motor 68.

The reversing of the motor 68 is controlled by sensing bolts 127 (FIG. 7A) on a left end 128 of the reel 57. For this purpose, a proximity limit 129 switch is mounted on the left end bracket 74. The switch 129 may be Model 112120 sold by General Equipment Manufacturing Company as a "GO" switch. The switch 129 has contacts 130 that are normally open in response to the force of a magnet 131. When the drum 59 rotates, the bolts 127 move through the path of the magnetic flux of the magnet 131 and weaken the flux so that the contact 130, which is a spring biased C form contact, moves and closes a circuit 133 to generate a counting pulse 134. The counting pulse 134 is applied to a programmable logic circuit 135 that stores the number of pulses 134. The number of bolts 127 counted is related to the number of revolutions of the reels 57 and 59 and thus to the position of the sludge collectors 29, 30 and 51 on the tracks 31. Thus, for example, when the sludge collector 51 in FIG. 3 reaches the right end 23 of the clarifier basin 20, the logic circuit 135 will have stored a predetermined number of pulses 134. The logic circuit 135 is programmed in a standard manner to generate a stop signal 136 in response to the storage of that number of pulses 134. Two seconds after the stop signal 136, the logic circuit 135 generates a forward/reverse signal 137. A motor control 138 (FIG. 5) for the dc motor 68 causes the motor 68 to stop in response to the stop signal 136, and to reverse its rotational direction in response to the forward/reverse signal 137. The logic circuit 135 then resets its pulse storage to zero. This cycle is repeated as the motor 68 operates in the opposite rotational direction, e.g., in the counterclockwise direction (arrow 63) FIG. 5.

It is to be understood that when the carriage 53 is at the right wall 23, the first reel 57 has wound the first tape 37 tightly onto the first hub 92, whereas the second coil 65 has self-expanded on the second reel 58 and under tension therefrom has supplied the second tape 39 to permit the carriage 53 to move to the right wall 23. As the motor 68 is reversed as described above, the two second delay between the stop signal 136 and the forward/reverse signal 137 allows the respective first and second tapes 37 and 39 to stabilize and stop on the respective reels 57 and 58. The carriage 53 also stops. As the motor 68 reverses its rotational direction, the tension from the first tape 37 on the first hub 92 is relieved and, as described above, the first coil 64 self-expands and applies force on the right side 112 of the carriage 53. The motor 68 causes the second reel 58 to wind in the second tape 39 and tightly wind the second coil 65 on the second hub 92. When the second coil 65 is tightly wound, the force of the second tape 39 on the left side 111 of the carriage 53 overcomes the force from the tension of the first tape 37 on the right side 112 of the carriage 53, and the carriage 53 moves to the left in FIG. 3. This reversing cycle occurs again, in reverse, when the carriage 53 reaches the left wall 22 of the basin 20.

While the preferred embodiments have been described in order to illustrate the fundamental relationships of the present invention, it should be understood that numerous variations and modifications may be made to these embodiments without departing from the teachings and concepts of the present invention. Accordingly, it should be clearly understood that the form of the present invention described above and shown in the accompanying drawings is illustrative only and is not intended to limit the scope of the invention to less than that described in the following claims.

What is claimed is:

1. In an apparatus for moving equipment in a clarifier basin provided with a track and a carriage movable on said track for carrying said equipment, said carriage having a first end and a second end, the improvement comprising:

a first thin metal tape attached to said first end of said carriage, said first tape having a characteristic of resisting being rolled into a first coil such that said first tape tends to uncoil itself;

a second thin metal tape attached to said second end of said carriage, said second tape having a characteristic of resisting being rolled into a second coil such that said second tape tends to uncoil itself;

a first reel having a first hub secured to said first tape for forming said first coil in said first tape;

a second reel having a second hub secured to said second tape for forming said second coil in said second tape;

a drum releasably secured to each of said first and second reels for rotating said first and second reels clockwise to wind said first tape on said first hub and unwind said second tape from said second hub, said drum also rotating said first and second reels counterclockwise to wind said second tape on said second hub and unwind said first tape from said first hub;

said unwound first and second tapes tending to uncoil themselves to form said respective first and second coils having increased diameters to apply tension on said respective first and second tapes tending to pull said tapes toward their respective reels;

a first retainer strap extending around a portion of said first reel in engagement with said first coil that has said increased diameter for retaining said first coil on said first reel; and a second retainer strap extending around a portion of said first reel in engagement with said second coil that has said increased diameter for retaining said second coil on said second reel;

said tendency of said first tape to uncoil being effective to apply tension to said first tape that applies a resistive force to said first end of said carriage;

said tendency of said second tape to uncoil itself being effective to apply tension to said second tape that applies a resistive force to said second end of said carriage;

said winding of said first tape on said first hub being effective to overcome said resistive force on said second end of said carriage and move said carriage in a first direction on said track, said carriage moving in said first direction being effective to unwind some of said second coil from said second reel as said clockwise rotation of said second reel permits said second coil to uncoil itself and apply said tension to said second tape; and said winding of said second tape on said second hub being effective to overcome said resistive force on said first end of said carriage and move said carriage in a second direction on said track, said carriage moving in said second direction being effective to unwind some of said first coil from said first reel as said counterclockwise rotation of said first reel permits said first coil to uncoil itself and apply said tension to said first tape.

2. In a system for collecting sludge from a floor of a clarifier basin, said basin having opposed first and second walls for containing liquid and particles suspended in said liquid, said suspended particles being settleable to said bottom to form said sludge, said clarifier basin including a guide track mounted on said bottom, said clarifier basin further including a carriage movable on said guide track between said opposite first and second walls of said basin, said carriage having means mounted thereon for collecting the sludge from said bottom, said carriage having a first end and a second end; the improvement comprising;

a first thin metal tape having a first end connected to said first end of said carriage, said first tape having a second end and having a characteristic of resisting being rolled into a coil;

a second tape having a third end connected to said second end of said carriage, said second tape having a fourth end and having a characteristic of resisting being rolled into a coil;

pulley means for guiding said first and second tapes from said respective first and second ends of said carriage to a common location;

tape drive means mounted at said common location for winding in said second end of said first tape and paying out said fourth end of said second tape to move said carriage on said track between said first and second walls of said clarifier basin, said tape drive means including:

first reel means connected to said second end of said first tape for winding said first tape thereon when said first reel means rotates in a first direction;

second reel means connected to said fourth end of said second tape for winding said second tape onto said second reel means upon rotation of said second reel means in a second direction opposite from said first rotational direction;

drum means mounted at said common location and releasably connected to each of said first and second reel means for rotating said first and said reels means together in either of said first or second rotational directions, rotation of said first and second reel means in said first rotational direction being effective to permit said first tape to uncoil itself on said first reel means to form a first enlarged coil on said first reel means and to tighten said second tape on said second reel means to wind in said second tape and move said carriage toward said second end of said clarifier basin, said first enlarged coil being effective to release said first tape under tension that tends to restrain said carriage from moving toward said second wall, said rotation of said first and second reel means in said second rotational direction being effective to reduce the size of said first coil on said first reel and tighten said first tape on said first reel to wind said first tape onto said first reel and move said carriage toward said first wall and to permit said second tape to uncoil itself on said second reel means to form a second enlarged coil that applies force to said carriage tending to restrain said carriage from moving from said second wall toward said first wall of said basin means; and means extending around at least a part of the outside of each of said first and second reel means for retaining each of said first and second enlarged coils on said respective first and second reel means.

3. In an apparatus for reciprocating equipment along a track mounted on a floor of a clarifier basin between a first wall and a second wall, said apparatus including a first pulley mounted on said floor adjacent said first wall and second and third pulleys mounted on said bottom adjacent said second wall, said track extending between said first pulley and said second and third pulleys, a carriage carrying said equipment and mounted on said track for movement between said first and second walls, said carriage having a first end nearest said first wall and a second end nearest said second wall, and a support plate mounted on said clarifier basin; the improvement comprising:

said support plate having a first slot and a second slot spaced from said first slot;

means for mounting said support plate on said clarifier basin above said second and third pulleys;

a first thin metal tape extending through said first slot, around said second pulley and said first pulley and being attached to said first end of said carriage, said first tape having a characteristic of resisting being rolled into a first coil such that said first tape tends to uncoil itself;

a second thin metal tape extending through said second slot, around said third pulley and attached to said second end of said carriage, said second tape having a characteristic of resisting being rolled into a second coil such that said second tape tends to uncoil itself;

a first reel having a first hub secured to said first tape for forming said first coil in said first tape before said first tape extends through said first slot;

a second reel having a first hub secured to said second tape for forming said second coil in said second tape before said second tape extends through said second slot;

a drum releasably secured to each of said first and second reels for rotating said first and second reels clockwise to wind said first tape on said first hub and unwind said second tape from said second hub, said drum also rotating said first and second reels counterclockwise to wind said second tape on said second hub and unwind said first tape from said first hub;

said unwound first and second tapes tending to uncoil themselves to form said respective first and second coils having increased diameters to apply tension on said respective first and second tapes extending through said respective first and second slots;

a first retainer strap having a first end secured to said support plate, extending around said first reel in engagement with said first coil that has said increased diameter and having a second end secured to said support plate to limit said diameter and retain said first coil on said first reel; and a second retainer strap having a first end secured to said support plate, extending around said first reel in engagement with said second coil that has said increased diameter and having a second end secured to said support plate to limit said diameter and retain said second coil on said second reel.

4. In an apparatus according to claim 3, the improvement further comprising:

said tendency of said first tape to uncoil being effective to apply tension to said first tape that applies a resistive force to said first end of said carriage;

said tendency of said second tape to uncoil itself being effective to apply tension to said second tape that applies a resistive force to said second end of said carriage;

said winding of said first tape on said first hub being effective to overcome said resistive force on said second end of said carriage and move said carriage in a first direction on said track, said carriage moving in said first direction being effective to unwind some of said second coil from said second reel as said clockwise rotation of said second reel permits said second coil to uncoil itself and apply said tension to said second tape; and said winding of said second tape on said second hub being effective to overcome said resistive force on said first end of said carriage and move said carriage in a second direction on said track, said carriage moving in said second direction being effective to unwind some of said first coil from said first reel as said counterclockwise rotation of said first reel permits said first coil to uncoil itself and apply said tension to said first tape.

5. Apparatus for reciprocating clarifier equipment along a track mounted in a clarifier basin said equipment having a first end and a second end, said basin provided with a first pulley on the side of said equipment nearest said first end and with a second pulley on the side thereof nearest said second end, comprising:

a first reel having a first hub provided with a first transverse slot;

a first metal tape having a first end and a second end, said first end being connected to said first end of said equipment, said first tape extending around said first pulley to said first reel, said second end of said first tape being received in said first slot;

a second reel having a second hub provided with a second transverse slot;

a second metal tape having a first end and a second end, said first end being connected to said second end of said equipment, said second tape extending around said second pulley to said second reel, said second end of said second tape being received in said second slot;

a drum for mounting each of said first and second reels for clockwise and counterclockwise rotation, said clockwise rotation of said first reel being effective to wind said first tape on said first hub into a first coil;

means for releasably and separately connecting said first and second reels to said drum to permit said drum to rotate said first reel and form said first coil while said second reel is not rotated;

said first tape having a characteristic of uncoiling, said characteristic being effective to apply tension tending to pull said first tape tightly around said first pulley and pull said first end of said first tape toward said first reel;

means for rotating said drum counterclockwise to wind said second tape on said second hub into a second coil and to apply tension to said second tape, said tension exceeding said tension on said first tape to pull on said second end of said equipment and move said equipment in a first direction on said track, said counterclockwise rotation being effective to unwind some of said first coil from said first hub, said uncoiling characteristic of said first tape being effective to continue to apply said tension tending to pull said first tape tightly around said first pulley; and a first strap extending partly around said first reel in engagement with said first coil to limit the extent to which said first tape uncoils in response to said uncoiling characteristic of said first tape.

6. Apparatus according to claim 5, further comprising:

said second tape having a characteristic of uncoiling, said characteristic being effective to apply tension tending to pull said second tape tightly around said second pulley and pull said second end of said second tape toward said second reel;

said rotating means being effective to rotate said drum clockwise to again wind said first tape on said first hub to form said first coil and to apply tension on said first tape that exceeds said tension on said second tape from said uncoiling characteristic of said second tape, said tension on said first tape being effective to pull on said first end of said equipment and move said equipment in a second direction on said track; and a second strap extending partly around said second reel in engagement with said second coil to limit the extend to which said second tape uncoils in response to said uncoiling characteristic of said second tape.

7. Apparatus according to claim 5, in which:

said drum has a longitudinal axis and at least one bore formed therein perpendicular to said axis; and said connecting means including a first ring connected to said first reel and rotatable freely on said drum, and a second ring connection to said second reel and rotatable freely on said drum, each of said first and second rings having an aperture formed therein, said rings being rotatable on said drum to align said aperture with said bore of said drum, said connecting means further including an index pin for each of said first and second rings, one of said index pins being insertable into said aligned bore and aperture to form a releasable driving connection between said drum and one of said first and second rings to rotate said first or second reel attached to said respective first or second ring.

* * * * *